Patented Dec. 30, 1941

2,268,140

UNITED STATES PATENT OFFICE 2,268,140

ALKYLATED AROMATIC SULPHONIC ACIDS

Josef Hengstenberg, Mannheim, and Walter Limbacher and Eberhard Nold, Ludwigshafen-on-the-Rhine, Germany, assignors, by mesne assignments, to General Aniline & Film Corporation, New York, N. Y., a corporation of Delaware No Drawing. Application August 15, 1939, Serial No. 290,228. In Germany August 18, 1938

3 Claims. (Cl. 260—505)

The present invention relates to alkylated aromatic sulphonic acids.

It has already been proposed to condense aromatic, in particular polynuclear, hydrocarbons or their sulphonic acids with two or more different alcohols and if necessary to sulphonate the resulting condensation products, and thus to obtain surface-active sulphonic acids suitable as textile assistants.

We have now found that especially active textile assistants can be obtained by condensing aromatic hydrocarbons, particularly polynuclear aromatic hydrocarbons or hydroaromatic hydrocarbons or their substitution products, particularly the sulphonation products of the same, with an alcohol containing from 3 to 5 carbon atoms in the molecule and also with an alcohol containing from 6 to 8 carbon atoms in the molecule, particularly isohexyl, isoheptyl or isooctyl alcohol or mixtures of these alcohols in any desired sequence and if necessary sulphonating and neutralizing the products obtained.

Suitable aromatic or hydroaromatic hydrocarbons and substitution products of these are for example benzene, toluene, naphthalene, methylnaphthalene, ethylnaphthalene, tetrahydronaphthalene, acenaphthene or phenanthrene, alpha- or beta-naphthalene sulphonic acids, chlornaphthalenes or clornaphthalene sulphonic acids.

The condensation of the said aromatic or hydroaromatic compounds with the alcohols containing from 3 to 5 carbon atoms in the molecule and hexyl, heptyl and/or octyl alcohol is preferably carried out with an addition of condensing agents, as for example concentrated sulphuric acid, zinc chloride or boric fluoride. Generally speaking it is preferable first to condense the aromatic compounds with hexyl, heptyl and/or octyl alcohol and then with propanol, butanol or pentanol. Mixtures of alcohols of the two classes may also be employed in the condensation step. Such a mixture is obtained for example by adding to propanol or butanol a mixture of isohexyl and isoheptyl alcohol which may be recovered from the high-boiling fractions of the alcohol mixture obtained in the catalytic hydrogenation of carbon oxides to methanol. It is preferable to use for each molecular proportion of the aromatic or hydroaromatic compound or their sulphonic acids 2 to 3 molecular proportions of such an alcohol mixture which contains propanol, butanol or pentanol in a preponderating amount, advantageously from about 1 to 1.5 molecular proportions of isohexyl, isoheptyl alcohol and/or isooctyl alcohol to from about 1.5 to 2 molecular proportions of propanol, butanol or pentanol.

Very active products are obtained when in addition to propanol and isohexyl, isoheptyl alcohol and/or isooctyl alcohol butanol is used. In this case it is advantageous to cause 1 molecular proportion each of propanol and butanol and 1 molecular proportion of isohexyl, isoheptyl and/or isooctyl alcohol to act on each molecular proportion of the aromatic hydrocarbon or its sulphonic acid. Active products are also obtained by reacting a mixture of a propanol or a butanol and an isooctanol (obtained by condensing aldole or crotonaldehyde and reducing the condensation product) with naphthalene, etc.

The condensation products obtained are sulphonated, for example with concentrated sulphuric acid, oleum or chlorsulphonic acid if they are not already sufficiently water soluble. The condensation of the alcohols with the aromatic or hydroaromatic compounds may also be carried out in one operation with simultaneous sulphonation by using condensing agents having a sulphonating action.

Instead of the alcohols themselves, the olefines corresponding to the alcohols or the esters of the alcohols with mineral acids, such as sulphuric acid or hydrochloric acid, may also be used.

In the said manner there are obtained very active wetting agents which have also a high dispersing power, in particular for oils, fats, waxes, paraffin waxes, organic solvents and also for dyestuffs. The products obtained possess also a good washing power.

The following examples will further illustrate how the said invention may be carried out in practice, but the invention is not restricted to these examples. The parts are by weight.

*Example 1*

128 parts of naphthalene, 126 parts of butanol and 94 parts of a mixture of isohexyl and isoheptyl alcohols obtained by catalytic hydrogenation of carbon monoxide are mixed together. Into the resulting mixture there are introduced at from about 25° to 30° C. about 270 parts of sulphuric acid of 67° Baumé strength and 500 parts of 24 per cent oleum. The sulphonation mixture is then stirred at from about 40° to 50° C. After allowing to stand, two layers form which are separated one from the other. The upper layer contains the alkylated naphthalene sulphonic acid. This may be used as such or after conversion into an alkali salt as a textile assistant. The free sulphonic acid is also suitable for splitting fats.

A product having similar properties is obtained for example by using instead of 126 parts of butanol and 94 parts of the mixture of isohexyl and isoheptyl alcohols, 74 parts of butanol and 118.5 parts of the said alcohol mixture.

*Example 2*

2120 parts of naphthalene are mixed with 2000 parts of a mixture of isohexyl and isoheptyl alcohols obtained by catalytic hydrogenation of carbon monoxide. Into the mixture there are introduced at from 20° to 30° C. about 6000 parts of sulphuric acid of 67° Baumé strength and the whole is stirred for about 45 minutes while raising the temperature to 50° C. After cooling for a short time, 2000 parts of normal propanol are rapidly added to the mixture and the whole stirred for 1 hour at from 40° to 55° C. There are then introduced into the mixture at from 20° to 30° C. 7500 parts of oleum and the whole is stirred for some time at about 50° C. After allowing to stand, two layers form which are separated one from the other. The upper layer, which contains the sulphonation product, is separated, worked up in the usual manner and neutralized. There is thus obtained a very good wetting and dispersing agent. The free sulphonic acid is also very suitable as an agent for splitting fats.

1750 parts of isohexyl alcohol or 2000 parts of isoheptyl alcohol may also be used instead of the said mixture of isohexyl and isoheptyl alcohols.

A very active product is obtained when for example about 2100 parts of isohexyl alcohol and then about 1300 parts of normal propanol are allowed to act on the above-mentioned amount of naphthalene and the condensation product is then sulphonated.

The normal propanol may be replaced by the same amount of isopropanol thus a good wetting agent also being obtained.

If instead of the aforesaid 2120 parts of naphthalene 1320 parts of benzene are used products with similar properties are obtained.

*Example 3*

2120 parts of naphthalene are mixed with 2000 parts of a mixture of isohexyl and isoheptyl alcohols and there are introduced into the mixture at from 25° to 30° C. about 6000 parts of sulphuric acid of 67° Baumé strength. The whole is then stirred for about an hour at from 45° to 55° C.; about 1200 parts of normal butanol are added at from 25° to 35° C. and stirring continued for 45 minutes at 40° C. After cooling for a short time, 1000 parts of normal propanol are added and the whole again stirred for about half an hour at from 40° to 45° C. The whole is cooled and 7000 parts of 24 per cent oleum are allowed to flow into the mixture which is then stirred at from about 45° to 55° C. for some time. After working up and neutralizing the sulphonation product, a very active wetting and dispersing agent is obtained.

The mixture of isohexyl and isoheptyl alcohol used may, as in Example 2, be replaced by 1750 parts of isohexyl alcohol or 2000 parts of isoheptyl alcohol.

The butanol employed in this example may be replaced by the corresponding amount of isoamyl alcohol, whereby a product with nearly the same properties is formed.

*Example 4*

Into a mixture of 85 parts of naphthalene and 87 parts of 2-ethyl hexanol 240 parts of sulphuric acid of 98 per cent strength are introduced while cooling and stirring in such a manner that the temperature does not rise above 30° C. The mixture is then stirred for about 1½ hours at 50 to 55° C. and cooled down to 35° C. 50 parts of normal butanol are then added whereupon the mixture is stirred for about one hour at 50° C. Then 40 parts of normal propanol are introduced into the mixture which is then stirred for about one hour at 55° C. After adding 280 parts of oleum (24% $SO_3$) the mixture is stirred for about 7 hours at 50° C. After standing for some time two layers are formed which are separated from one another. The upper layer which contains the sulphonation product is worked up in usual manner and neutralized. A product is obtained which has an excellent wetting and dispersing power. The free sulphonic acid is well suitable for splitting fats.

A product having similar properties is obtained if instead of 2-ethyl hexanol the 2.5-dimethyl hexanol is employed.

*Example 5*

Into a mixture of 85 parts of naphthalene and 112 parts of 2-ethyl hexanol are introduced while cooling 240 parts of sulphuric acid of 98 per cent strength, whereupon the whole mixture is stirred for about 1½ hours at 50° C. Then 56 parts of normal propanol are added and the mixture is stirred for about one hour at 50° C. After cooling down to a temperature below 30° C. 280 parts of oleum (24% $SO_3$) are introduced into the mixture, whereupon it is again stirred for some hours. The mixture is then worked up in the manner described in Example 4. A sulphonation product is obtained which possesses an excellent wetting power.

A product having a high wetting power is also obtained if instead of 2-ethyl hexanol 2.5-dimethyl hexanol is employed.

What we claim is:

1. An alkylated naphthalene sulphonic acid containing at least one butyl radical and at least one isohexyl and one isoheptyl radical attached to the naphthalene radical.

2. An alkylated naphthalene sulphonic acid containing at least one propyl radical and at least one isohexyl and one isoheptyl radical attached to the naphthalene radical.

3. A mixture of alkylated aromatic sulphonic acids containing in the molecule at least one alkyl radical selected from the class consisting of propyl, butyl and amyl radicals and at least one alkyl radical selected from the class consisting of isohexyl, isoheptyl and iso-actyl radicles.

JOSEF HENGSTENBERG.
WALTER LIMBACHER.
EBERHARD NOLD.